UNITED STATES PATENT OFFICE.

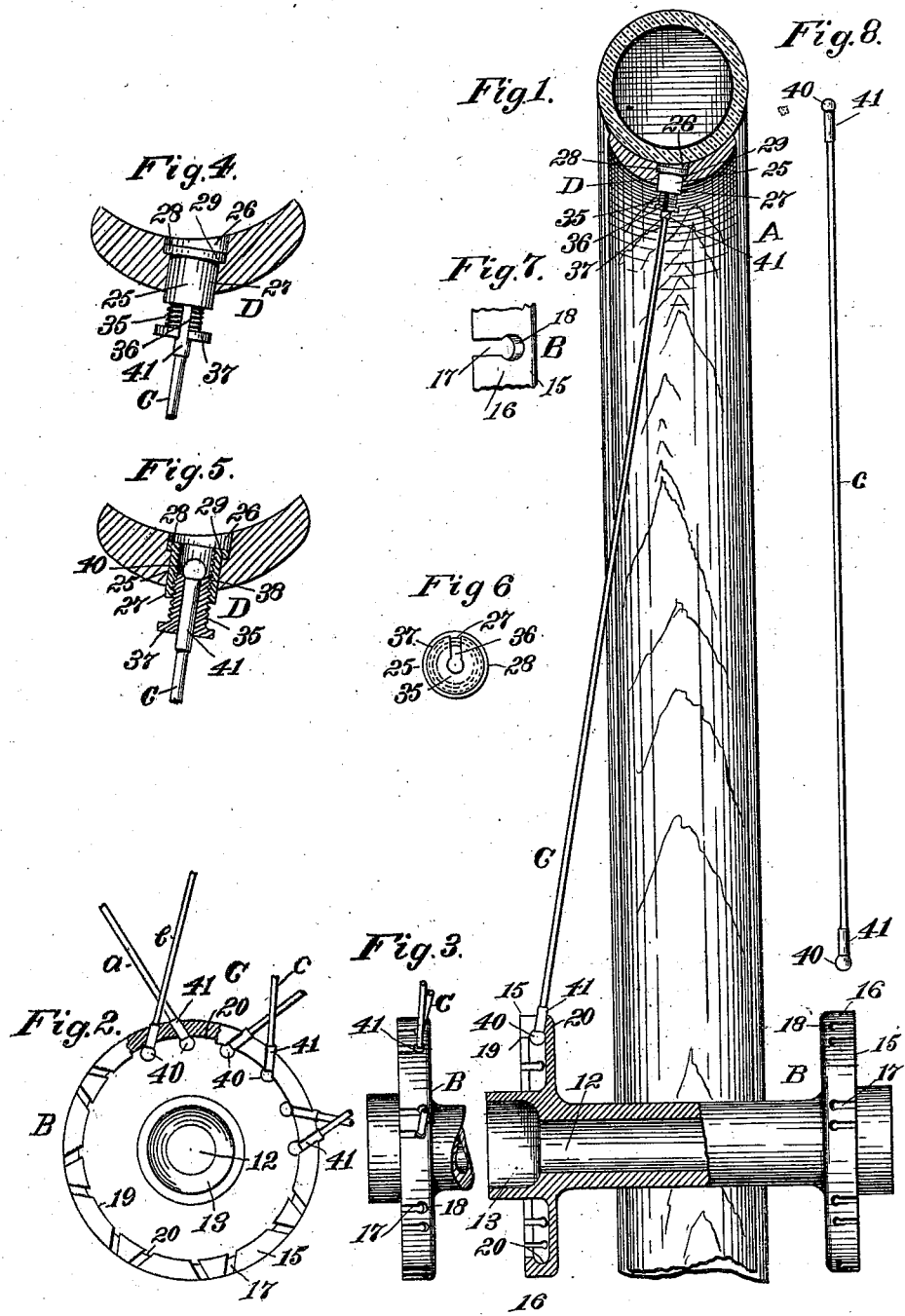

ARTHUR J. WOLFF, OF HARTFORD, CONNECTICUT.

VEHICLE-WHEEL.

SPECIFICATION forming part of Letters Patent No. 556,123, dated March 10, 1896.

Application filed November 20, 1895. Serial No. 569,553. (No model.)

*To all whom it may concern:*

Be it known that I, ARTHUR J. WOLFF, a citizen of the United States, residing at Hartford, in the county of Hartford and State of Connecticut, have invented certain new and useful Improvements in Vehicle-Wheels, of which the following is a specification.

My invention relates to vehicle-wheels, but more especially, however, to that class of wheels known in the art as "bicycle" and "tricycle" wheels, and more particularly relates to the attachment of the spokes thereof; and the object of my invention is to provide a wheel in which a defective spoke can be quickly and easily removed and replaced by a new spoke, and whereby also the tension of the spokes can be regulated relatively to each other for properly truing the wheel and maintaining the same in condition for use.

A further object of my invention is to provide a wheel in which the spokes will be reversible and interchangeable with each other and will be without flexure from end to end thereof, when in position, and will be relatively stronger at their points of juncture with the rim and hub than at their intermediate portions.

In the accompanying drawings, forming part of this application, Figure 1 is a diametrical partly-sectional view, on an enlarged scale, of a portion of a wheel, showing one of the spokes in position thereon. Fig. 2 is an end view of the wheel-hub, partly broken away and showing the ends of some of the spokes in position relatively thereto. Fig. 3 is an elevation of one portion of the wheel-hub, showing a portion of some of the spokes in position relatively thereto. Fig. 4 is a cross-sectional view of the felly or rim and shows, in elevation, the means for securing and adjusting the spokes relatively thereto. Fig. 5 is a vertical cross-sectional view of the felly or rim and the means for securing and adjusting the spokes relatively thereto. Fig. 6 is an under end view of my improved spoke securing and adjusting means detached. Fig. 7 is a top view of a portion of the wheel-hub flange, and Fig. 8 is a view of one of the spokes detached.

Similar characters of reference indicate like parts in all figures of the drawings.

According to many constructions of bicycles and tricycles ordinarily in use the spokes are threaded adjacent to their ends to secure the same in threaded sockets or sleeves in the felly and hub of the wheel. This means of securing the spokes in position is extremely disadvantageous, in that the threads on the spokes not only weaken the same, owing to the relatively small diameters of the spokes, whereby they frequently break at these threaded portions, but in some constructions of wheels, after the spokes have been broken, the sockets or sleeves have to be bored out to remove the threaded ends of the broken spokes in order to insert a new spoke. To obviate these defects I have provided a wheel in which the spokes therein will not only be stronger at the juncture thereof with the felly and hub than at their intermediate portions, but I have also provided a wheel in which straight spokes, reversible and interchangeable with each other and quickly removable, can be used, and which wheel, in the preferred form thereof herein shown and described, consists, in a general way, of a rim or felly, (designated generally by A,) a hub, (designated generally by B,) a series of spokes, (designated generally by C,) connecting said rim and hub, and suitable means (designated generally by D) for removably securing and adjusting the spokes relatively to the felly or rim, and also for regulating the longitudinal tension of said spokes.

The hub B of the wheel may be of any suitable or well-known construction, so far as concerns that portion which is supported on the axle or shaft, and in the form shown the hub has the usual bearing portion 12 for receiving such axle, and is provided at its ends with the usual cups or roller-bearing members 13. The hub B, however, in the preferred construction thereof herein shown and described has an annular spoke-flange adjacent to each end thereof adapted to carry the ends of the spokes adjacent to the hub, and which spoke-flanges are herein shown in the nature of chambered or cup flanges 15, preferably opening in opposite directions to each other. Each of these spoke-flanges 15 is provided with a series of slots in the rim 16 thereof, each slot having differential diameters, and which are herein shown in the nature of keyhole-slots 17 opening at the free edge of the rim 16 of the flange 15. These slots 17 are disposed in the rim in pairs, each slot of a pair being parallel with and inclined toward the other or companion slot of the pair, whereby each spoke will be tangentially disposed relatively to the periphery of the wheel-hub flange, and each pair of spokes, as $a$ and $b$, will cross each other at a point intermediate of the hub and felly, which crossing-point is dependent, however, upon the degree of inclination of the slots of each pair toward each other. In the construction shown, however, each pair of spokes $a$ and $b$ cross each other adjacent to the hub, whereby each spoke will be crossed twice between the hub and felly—that is to say, the spoke $b$, for instance, is crossed by the spoke $a$ adjacent to the hub, and will be crossed by the spoke $c$ adjacent to the felly. It will be understood, however, that the slots need not necessarily be inclined or disposed in pairs, but may be disposed radially relatively to the axis of the hub and at equal distances or at any desired distance apart and still be within the scope of my invention. The inner wall 18 of each slot is inclined toward the felly or rim of the wheel when the flanges are adjusted to the ends of the hub, and the inner wall 19 of the rim 16 of the spoke-flange 15 has an annular groove 20 therein into which the inclined enlarged portions of the keyhole-slots 17 open.

The means D for securing and adjusting the spokes in position relatively to the felly or rim of the wheel, and which are in the nature of connectors, in the preferred form thereof herein shown and described, consists of an interiorly-screw-threaded and headed nipple or sleeve 25, adapted to be seated in a recess or opening 26 in the felly or rim of the wheel, which recess is shown of differential diameters. The sleeve portion 27 of this nipple projects through that part of the recess having the smallest diameter, and the head 28 thereof rests within that portion of the recess 26 having the largest diameter and on the juncture-wall 29 of these recesses. These recesses 26 are inclined in a direction toward the spoke-flanges in alternation—that is to say, the inclination of one recess or opening 26 will be, for instance, toward the left-hand spoke-flange and preferably in the same plane of inclination as an inclined wall 18 of a flange-slot 17, while the inclination of the next recess will be toward the right-hand spoke-flange, and likewise preferably in the same plane of inclination as an inclined wall 18 of a flange-slot 17, whereby the spokes will be straight from end to end thereof. It will be understood, however, that it is not necessary that these inclined recesses or openings should be disposed in alternation, as they may be disposed in any desired way—such, for instance, as by having a series thereof inclined in one direction toward one spoke-flange and a series thereof inclined in the opposite direction toward the other spoke-flange.

It will also be understood that if it is desired to use a curved or bent spoke the inclined openings 26 may be formed in a plane at right angles to the axis of the wheel; but the preferable construction, however, is to have these openings inclined, whereby the spokes may be straight and without flexure from end to end thereof.

An exteriorly-screw-threaded tubular stem 35, having a slot of differential diameters extending from end to end and opening at the periphery thereof, and herein shown in the nature of a keyhole-slot 36, is adapted to engage the interior screw-threads of the sleeve or nipple, and is adjustable therein by means of a suitable milled head 37. This slotted stem is provided at its inner end opposite to its head with a concavity or recess 38 for the purpose hereinafter set forth.

The spokes C in the preferred form thereof herein shown and described are straight and without flexure from end to end thereof and interchangeable and reversible, and are constructed with enlarged ends formed in any suitable way. In the preferred form shown each spoke is provided with an enlarged head 40 and a reinforcing portion or neck 41 at each end thereof, preferably integral with the spoke and head.

In assembling the spokes relatively to the felly and hub that portion of a spoke having the smallest diameter is inserted through the keyhole-slot of the hub, and the enlarged head 40 thereof drawn into firm engagement with the groove 20 in the inner wall of the rim thereof, whereby the neck 41 of the spoke will extend through that portion of the keyhole-slot having the largest diameter and rest against the inclined wall 18 of the same. A slotted stem 35 is then placed on the spoke at that portion thereof likewise having the smallest diameter and slipped into position to have the neck 41 extend through that portion of the keyhole-slot of the stem having the largest diameter, whereby the stem can be screwed into the sleeve or nipple 27 and on turning the same draw the enlarged head 40 of the spoke into firm engagement with the concaved or recessed end 38, whereby the spoke will be tightly held in position relatively to the spoke-flanges and the wheel-rim. By adjusting this stem 35 relatively to the sleeve or nipple 27 of the connector the longitudinal tension of the spokes can be regulated in a manner that will be obvious from the foregoing description.

By making the spokes interchangeable and reversible the cost of manufacture, setting up, and centering of the wheel is not only reduced, but the repairing thereof is facilitated, as when a spoke becomes broken it can be quickly and easily removed and be replaced by a perfect one. It will also be obvious that the spokes can be quickly and easily adjusted and the longitudinal tension thereof maintained at all times, it being simply necessary to actuate the stem within the sleeve to tighten or loosen a spoke.

By means of my improved spoke attachment I am enabled to easily detach a defective spoke and replace the same by a perfect one by simply unscrewing the stem from the sleeve or nipple.

Having thus described my invention, I claim—

1. A wheel consisting of a felly; a hub having a flange, the rim thereof having keyhole-slots disposed therein in pairs, each slot of a pair inclining toward its companion slot, and the inner walls of said slots inclining toward the felly of the wheel; and said rim having a groove in its inner wall into which the enlarged portions of the keyhole-slots open; and spokes having enlarged heads connecting said flange and felly.

2. A connector for spokes, consisting of an interiorly-threaded sleeve or nipple and an integral exteriorly-threaded stem adapted to engage said threaded sleeve, and having a keyhole-slot therein extending from end to end, and opening at the periphery thereof and having a recessed or concaved end.

3. A wheel consisting of a felly, having oppositely-inclined recesses disposed in alternation; a connector seated in each of said recesses and comprising an interiorly-threaded sleeve and an exteriorly-threaded stem having a keyhole-slot extending from end to end and opening at the periphery thereof, and having a concaved or recessed end; a hub having chambered spoke-flanges, the rims of said flanges having keyhole-slots disposed in pairs, each slot of a pair inclining toward its companion slot, and the inner wall of each slot inclining toward the felly of the wheel; and spokes having enlarged heads and necks, and secured to said connectors and spoke-flanges for connecting the hub and felly.

4. A wheel consisting of a felly, having oppositely-inclined recesses disposed in alternation, each recess having differential diameters; a connector seated in each of said recesses, and comprising an interiorly-threaded and headed sleeve, and an exteriorly-threaded stem having a keyhole-slot extending from end to end and opening at the periphery thereof, and having a concaved or recessed end; a hub having chambered spoke-flanges, the rims of said flanges having keyhole-slots disposed in pairs, each slot of a pair inclining toward its companion slot, and the inner wall of each slot inclining toward the felly of the wheel, and each rim having a groove on its interior wall into which the enlarged portion of each keyhole-slot opens; and spokes having enlarged heads and necks, and secured to said connectors and spoke-flanges for connecting the hub and felly.

5. A wheel consisting of a felly having oppositely-inclined recesses disposed in alternation; a removable connector seated in each of said recesses, and comprising an interiorly-threaded sleeve and an exteriorly-threaded and slotted stem engaging said threaded sleeve; a hub having chambered spoke-flanges, and having slots disposed in pairs in each rim thereof; each slot of a pair inclining toward its companion slot, and having its inner wall in the same plane of inclination as one of the inclined recesses of the felly; and a series of reversible and interchangeable straight spokes having enlarged heads, and having their inner ends fitting into the slots of the spoke-flanges, and tangentially disposed relatively to the periphery of the rim thereof; and having their outer ends fitting into the slots of the stems of the connectors and adjustably secured therein, whereby the longitudinal tension of said spokes can be regulated; and each of the spokes of one set being crossed intermediate of the felly and spoke-flange by two of the spokes of the same set of spokes.

ARTHUR J. WOLFF.

Witnesses:
 FRED. J. DOLE,
 F. N. CHASE.